United States Patent
Allen

[11] 3,797,519
[45] Mar. 19, 1974

[54] MULTISTAGE FLOW CONTROL VALVE
[75] Inventor: Thomas E. Allen, Mustang, Okla.
[73] Assignee: Caterpillar Tractor Co., Peoria, Ill.
[22] Filed: Nov. 5, 1971
[21] Appl. No.: 195,967

[52] U.S. Cl............ 137/512, 137/513.7, 137/525.5
[51] Int. Cl...................... F16k 15/08, F16k 15/14
[58] Field of Search............ 137/512, 513.7, 525.3, 137/525, 525.5, 516.15, 513.3

[56] References Cited
UNITED STATES PATENTS

| | | | |
|---|---|---|---|
| 3,513,753 | 5/1970 | Phillips | 91/368 |
| 3,580,277 | 5/1971 | Gettel | 137/525.5 |
| 573,342 | 12/1896 | Miller | 137/513.7 |
| 1,602,647 | 10/1926 | Carr | 137/512 X |
| 3,646,957 | 3/1972 | Allen | 137/525 |
| 2,924,237 | 2/1960 | Ellis | 137/513.7 X |
| 610,253 | 9/1898 | Bell | 137/512 X |
| 1,355,230 | 10/1920 | Kaiser | 137/512 X |

Primary Examiner—William R. Cline
Attorney, Agent, or Firm—Fryer, Tjensvold, Feix, Phillips & Lempio

[57] ABSTRACT

A multistage flow control valve utilizes a plurality of Belleville springs as valving elements which are positioned in a housing and responsive to successive predetermined pressures to divert fluid to selective successive outlets.

7 Claims, 2 Drawing Figures

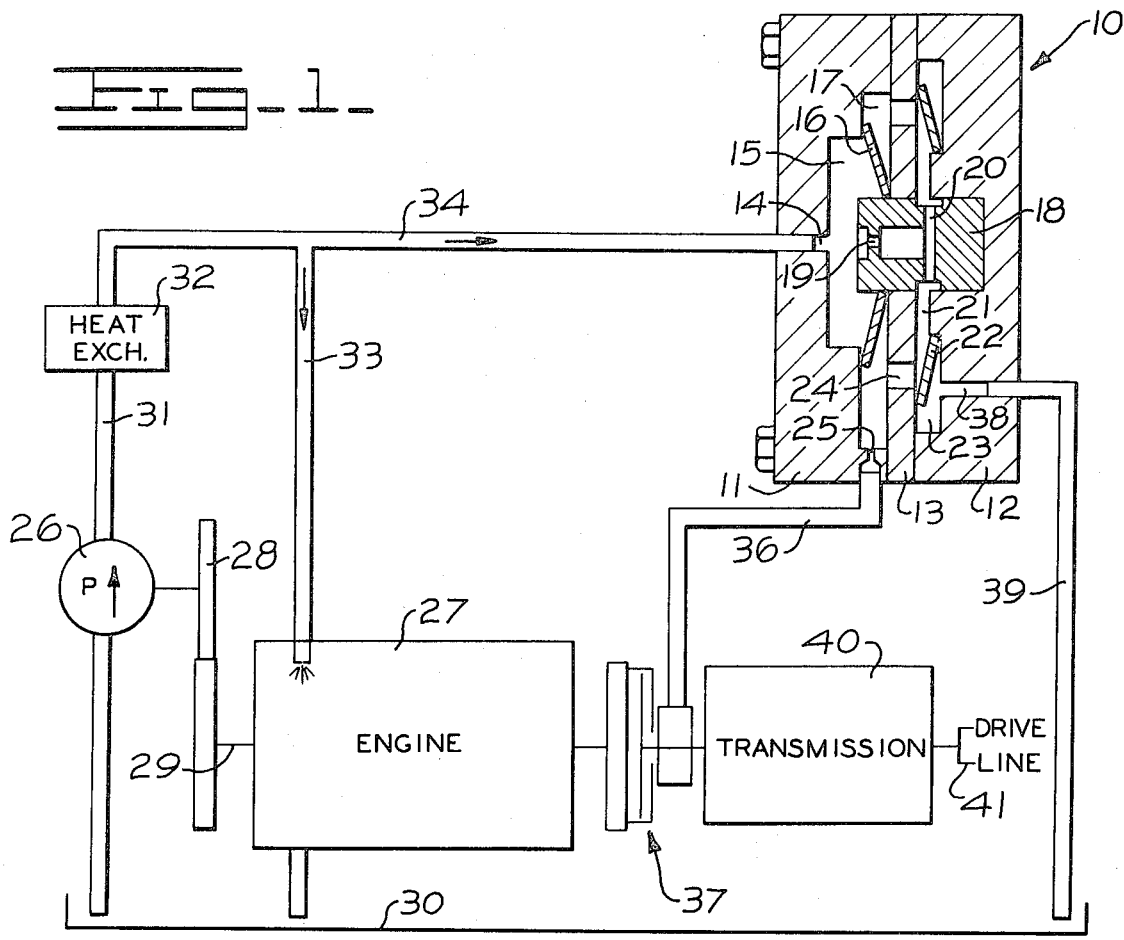
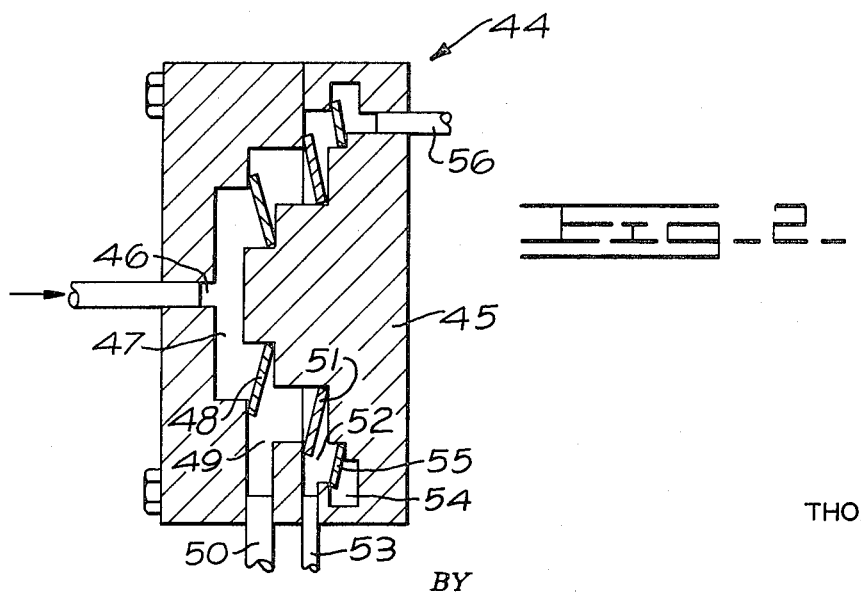
INVENTOR
THOMAS E. ALLEN

MULTISTAGE FLOW CONTROL VALVE

BACKGROUND OF THE INVENTION

This invention relates to valves and pertains more particularly to a multistage flow control valve.

A number of vehicles and machines employ a number of different systems requiring a supply of fluid for lubricating or controlling various elements in the different systems. Such systems often have different flow and pressure requirements and because of the limitations of present flow control valves, such systems must employ an entirely separate fluid supply for each system even though identical fluids are used.

Conventional valves for controlling differential pressures employ spring biased spools in mating bores and sized orifices. Such spool type differential valves have numerous disadvantages. Among the disadvantages are sluggishness in cold temperatures due to high oil viscosity and close fitting parts or small orifices. Another disadvantage is the high cost of manufacture due to closely finished parts, complicated porting and passageways, and special finishing operations. Also the necessary size of the spools result in costly space consumption as well as large mass which results in sluggishness in response and overshooting.

SUMMARY OF THE INVENTION

The primary object of the present invention is to provide a differential valve which is compact and inexpensive, and permits the use of a single fluid supply for several different systems requiring the same grade of oil at different pressures and flow rates.

Another object of the present invention is to provide a differential control and relief valve which is quick and accurate in its response.

In accordance with the present invention a differential control and relief valve utilizes a plurality of Belleville type spring elements to function as valve elements which are each responsive to a different predetermined pressure to divert fluid to and/or from a plurality of different demand stations.

BRIEF DESCRIPTION OF THE DRAWINGS

The above and other objects and advantages of the present invention will become apparent from the following description when read in conjunction with the accompanying drawings in which:

FIG. 1 is a sectional view of a preferred embodiment of the present invention shown in conjunction with a schematic illustration of a fluid supply system having a plurality of use terminals;

FIG. 2 is a sectional view of an alternate embodiment of the present invention.

DETAILED DESCRIPTION OF PREFERRED EMBODIMENTS

Referring now to the drawings, and in particular to FIG. 1, there is illustrated a differential relief valve of the present invention generally designated by the numeral 10 incorporated in a fluid supply system as more fully detailed below. The valve assembly comprises a pair of housing members 11 and 12 separated by a plate 13 and having a plurality of chambers formed therein. An inlet opening 14 admits pressurized fluid to a first chamber 15 which is separate by means of a frusto-conical spring 16 commonly referred to as a Belleville spring, from an annular chamber 17. The Belleville spring 16 is centrally positioned within chamber 17, and supported by support means 18. A restricted passageway which includes an orifice 19 and passageways 20 are provided for supplying fluid to a chamber 21. The chamber 21 is separated by means of a Belleville type spring 22 from an annular chamber 23. The fluid passing through orifice 19 and passageways 20 is permitted to flow through passageways 24 to a restricted outlet such as an outlet orifice 25.

The above described valve is illustrated in conjunction with an engine and clutch lubricating system for a vehicle. A pump 26, driven by an engine 27, such as by means of a geared connection 28 to the crankshaft 29, supplies fluid from a reservoir 30 to a conduit 31. The fluid passes through a heat exchanger 32 and then by conduit 33 to supply the lubricant for engine 27.

A portion of the fluid flows by means of conduit 34 to chamber 15 where a limited portion flows by means of orifice 19, passageway 20, through chamber 21, passageway 24, and outlet orifice 25 to supply lubricant which is conveyed by conduit 36 to supply lubricant for clutch 37. The pressure of the fluid communicated via orifice 19 to chamber 17 acts on the back or conves sides of valve element 16 to assist in biasing it to its closed position. Thus, as is apparent a differential pressure is imposed on the valve element by the pressurized fluid. When the pressure in chamber 15 exceeds a first predetermined level, the outer periphery of spring 16 is forced away from the chamber wall permitting fluid to flow directly from chamber 15 into chamber 17, and directly to orifice 25, thus partially bypassing the orifice 19.

If pressure builds up past a second predetermined value, pressure buildup in chamber 17 is transmitted through passages 24 into chamber 21 where the fluid pressure forces the Belleville spring 22 out of engagement with the wall formed by plate 13, thus permitting fluid to flow into annular chamber 23 and through an outlet conduit or opening 38 by means of conduit 39 back to reservoir 30. Thus, the clutch 37 which couples an engine 27 to a transmission 40 and drive link 41 is supplied with a lubricant at a certain low or minimum flow rate at low pressures and a certain maximum flow rate at higher pressures.

Referring now to FIG. 2, there is illustrated an alternate embodiment of the present invention generally designated by the numeral 44 which comprises a housing 45 comprising a plurality of chambers. An inlet opening 46 supplies pressurized fluid to a first chamber 47 which is separated by means of a Belleville type spring 48 from an annular shaped second chamber 49 which has an outlet spring 50. The annular chamber 49 is separated by means of a Belleville type spring 51 from an annular shaped third chamber 52, having an opening 53. The annular chamber 52 is in turn separated from an annular shaped fourth chamber 54 by means of a Belleville spring 55. The annular chamber 54 is provided with an outlet opening 56. This provides a simplified differential relief valve capable of supplying pressurized fluid or alternately diverting pressurized fluid at different pressure stages to successive terminal uses.

Thus from the above description it is seen that I have devised a multistage differential relief valve utilizing a plurality of Belleville type resilient washers or springs dividing a chamber into a plurality of chambers and responsive to successive differential predetermined pressures to divert a fluid supply in successive stages at predetermined pressures to multiple terminal or demand stations.

What is claimed is:

1. A differential control valve, said valve comprising:
   a housing having an axially extending radially stepped chamber formed therein;
   an inlet opening for supplying pressurized fluid to said chamber;
   a plurality of axially disposed individual resilient washers each defining separate single valve elements positioned at their inner diameter in a fixed axial position in said chamber and engaging axially spaced annular seats defined by radial walls of said chamber with their outer diameter to divide it into a plurality of successive chambers separated from said inlet by said respective valve elements;
   each of said resilient washers defining the sole spring means biasing said valve element to a closed position;
   a plurality of outlet openings communicating with separate ones of said successive chambers for supplying fluid to a plurality of demand stations; and,
   each of said successive valve elements being responsive to a successively higher predetermined pressure to permit fluid to pass into the next successive chamber and therefrom via said outlet openings to said demand stations.

2. The valve of claim 1 wherein said valve elements are Belleville type spring washers.

3. A differential control valve, said valve comprising:
   a housing having a chamber formed therein;
   an inlet opening for supplying pressurized fluid to said chamber;
   a plurality of axially disposed individual resilient washers each defining separate single valve elements positioned at their inner diameter in said chamber and engaging axially spaced annular seats in said chamber with their outer diameter to divide it into a plurality of successive chambers separated from said inlet by said respective valve elements;
   each of said resilient washers defining the sole spring means biasing said valve elements to a closed position;
   a plurality of outlet openings communicating with separate ones of said successive chambers for supplying fluid to a plurality of demand stations;
   each of said successive valve elements being responsive to a successively higher predetermined pressure to permit fluid to pass into the next successive chamber and therefrom via said outlet openings to said demand stations; and
   a restricted passageway for permitting a limited flow of fluid from said first chamber to a second chamber and thereby into one of said outlet openings so that the pressure of said fluid is communicated to the back of the first of said washers to thereby assist in biasing said valve element to a closed position.

4. The valve as defined in claim 3 wherein each of said successive chambers has a greater diameter than the previous one.

5. A differential multi-station control valve, said valve comprising:
   a housing having an axially extending radially stepped chamber formed therein;
   fixed support means disposed coaxially in said chambers;
   a plurality of Belleville type resilient washers defining separate successive valve elements and positioned at their inner diameter on said support means in said chamber and engaging said housing at the outer periphery thereof so as to divide it into a plurality of successive axially disposed chambers;
   each of said successive washers being responsive to a successively higher predetermined pressure on the concave side thereof to permit fluid to pass around the outer periphery thereof into the next successive chamber;
   an inlet opening for supplying pressurized fluid to a first one of said successive chambers;
   an outlet opening communicating with each of the remainder of said successive chambers; and,
   an orifice for permitting a limited flow of fluid from said first chamber to a second chamber to the convex side of the first of said Belleville washers and thereby communicate the pressure of said fluid thereto to oppose the opening of said valve element and to convey a minimum flow of said fluid to one of said outlet openings.

6. The valve as defined in claim 5 wherein each of said successive chambers has a greater diameter than the previous one.

7. The valve as defined in claim 5 wherein said successive chambers are annular in configuration and are concentrically disposed; and,
   the diameter of each successive chamber is greater than the diameter of the previous chamber.

* * * * *